US012794002B2

(12) United States Patent
Kim et al.

(10) Patent No.: US 12,794,002 B2
(45) Date of Patent: Nov. 10, 2026

(54) CELL STACK MANUFACTURING DEVICE FOR SECONDARY BATTERIES

(71) Applicant: LG ELECTRONICS INC., Seoul (KR)

(72) Inventors: Taean Kim, Seoul (KR); Sungchul Kim, Seoul (KR); Chunseok Bang, Seoul (KR); Seongmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 66 days.

(21) Appl. No.: 18/861,788

(22) PCT Filed: Dec. 22, 2022

(86) PCT No.: PCT/KR2022/021100
§ 371 (c)(1),
(2) Date: Oct. 30, 2024

(87) PCT Pub. No.: WO2023/224206
PCT Pub. Date: Nov. 23, 2023

(65) Prior Publication Data

US 2025/0357521 A1 Nov. 20, 2025

(30) Foreign Application Priority Data

May 16, 2022 (KR) ........................ 10-2022-0059665
Oct. 25, 2022 (KR) ........................ 10-2022-0138569

(51) Int. Cl.
*H01M 10/04* (2006.01)
*B65H 23/188* (2006.01)

(52) U.S. Cl.
CPC .... *H01M 10/0404* (2013.01); *B65H 23/1888* (2013.01); *H01M 10/0459* (2013.01)

(58) Field of Classification Search
CPC ......... H01M 10/0404; H01M 10/0459; H01M 10/0583; H01M 10/04; Y02P 70/50;
(Continued)

(56) References Cited

U.S. PATENT DOCUMENTS 4,216,579 A * 8/1980 Murata .................. B65B 11/08
29/730
4,846,454 A * 7/1989 Parkander .......... B65H 45/1015
493/324
(Continued)

FOREIGN PATENT DOCUMENTS

CN 102479970 5/2012
CN 103579659 2/2014
(Continued)

OTHER PUBLICATIONS

PCT International Application No. PCT/KR2022/021100, International Search Report dated Apr. 3, 2023, 5 pages.
(Continued)

*Primary Examiner* — Donghai D Nguyen
(74) *Attorney, Agent, or Firm* — LEE, HONG, DEGERMAN, KANG & WAIMEY

(57) ABSTRACT

A cell stack manufacturing device for secondary batteries is disclosed. The cell stack manufacturing device for secondary batteries may adjust the rotation speed of the feeder roll according to a moving speed and/or a moving position (trajectory) of a guide roller to adjust the tension of the separator. In addition, the cell stack manufacturing device for secondary batteries may control the tension of the separator by the moving speed and moving trajectory of the guide roller. The cell stack manufacturing device for secondary batteries may include a separator supply unit, a tension adjustment unit, and a stack stacking unit. The tension adjustment unit may be provided with a feeder roll
(Continued)

that is rotated by a feeder roll drive unit to adjust the tension of the separator.

19 Claims, 4 Drawing Sheets

(58) Field of Classification Search
CPC .. B65H 23/1888; B65H 23/192; B65H 31/10; B65H 31/26; B65H 45/10; B65H 23/048; Y10T 29/53135
See application file for complete search history.

(56) References Cited

U.S. PATENT DOCUMENTS

| | | | | |
|---|---|---|---|---|
| 9,902,563 | B2 * | 2/2018 | Iwata | H01M 10/0404 |
| 12,463,239 | B2 * | 11/2025 | Kim | H01M 10/0459 |

FOREIGN PATENT DOCUMENTS

| | | |
|---|---|---|
| CN | 106025375 | 10/2016 |
| CN | 206194903 | 5/2017 |
| CN | 113811500 | 12/2021 |
| EP | 3754772 | 12/2020 |
| JP | 2008-257303 | 10/2008 |
| KR | 10-2014-0015994 | 2/2014 |
| KR | 10-2018-0001324 | 1/2018 |
| KR | 10-2021-0031152 | 3/2021 |
| KR | 10-2021-0098538 | 8/2021 |
| WO | 2022-014753 | 1/2022 |

OTHER PUBLICATIONS

Korean Intellectual Property Office Application No. 10-2022-0138569, Office Action dated Sep. 17, 2024, 7 pages.
European Patent Office Application Serial No. 22942869.3, Search Report dated Aug. 25, 2025, 10 pages.
The State Intellectual Property Office of the People's Republic of China Application Serial No. 202280096102.0, Office Action dated Jan. 7, 2026, 14 pages.

* cited by examiner

CELL STACK MANUFACTURING DEVICE FOR SECONDARY BATTERIES

CROSS-REFERENCE TO RELATED APPLICATIONS

This application is the National Stage filing under 35 U.S.C. 371 of International Application No. PCT/KR2022/021100, filed on Dec. 22, 2022, which claims the benefit of earlier filing date and right of priority to Korean Application Nos. 10-2022-0059665, filed on May 16, 2022, and 10-2022-0138569, filed on Oct. 25, 2022, the contents of which are all hereby incorporated by reference herein in their entireties.

TECHNICAL FIELD

The present disclosure relates to a cell stack manufacturing device for secondary batteries, and more particularly, to a cell stack manufacturing device for secondary batteries capable of maintaining and adjusting a tension of a separator.

BACKGROUND ART

A secondary battery is an element that converts electrical energy into chemical energy, stores the converted electrical energy, and then generates electricity when needed, wherein both charging and discharging occur at a single electrode, and an oxidation electrode (anode, minus (−) electrode) and a reduction electrode (cathode, plus (+) electrode) are distinguished based on a discharge reaction.

The secondary battery includes positive and negative electrode plates having an active material applied to a current collector thereof, a separator that separates the positive and negative electrode plates, an electrolyte that transmits ions through the separator, a case that accommodates the positive electrode plate, the separator, and the negative electrode plate, and a lead tap connected to the positive and negative electrode plates to extend outward therefrom.

Such a secondary battery has a form in which a positive electrode plate, a separator, and a negative electrode plate are sequentially stacked and immersed in an electrolyte solution, and there are two main methods of manufacturing a cell stack for such secondary batteries.

In the case of a small-sized secondary battery, a method of placing negative and positive electrode plates on a separator and winding them to into a jelly-roll is widely used for manufacture thereof, and in the case of a medium and large-sized secondary battery with greater electric capacity, a method of stacking negative and positive plates and a separator in an appropriate order is widely used for manufacture thereof.

There are several methods of manufacturing a cell stack for secondary batteries in a stacking manner. Among them, there is a Z-stacking method in which a separator is folded in a zigzag manner and negative and positive electrode plates are stacked in a shape of being alternately inserted therebetween.

A cell stack for secondary batteries configured in such a Z-stacking shape is disclosed in several prior arts, such as Korean Patent Publication No. 10-2021-0031152.

The Korean Patent Publication No. 10-2021-0031152 discloses a cell stack manufacturing system for secondary batteries capable of manufacturing a cell stack by supplying a separator onto a stack table that moves back and forth laterally.

However, a cell stack manufacturing system for secondary batteries disclosed in the Korean Patent Publication No. 10-2021-0031152 has difficulty in improving a production speed of a cell stack due to a weight of a stack table that moves back and forth laterally, and has difficulty in controlling a tension of a separator since there is no element that can adjust (control) the tension of the separator between a separator unwinder and a stack table.

DISCLOSURE OF INVENTION

Technical Problem

An aspect of the present disclosure is to provide a cell stack manufacturing device for secondary batteries capable of adjusting a tension of a separator as well as improving a production speed of a cell stack by adjusting the tension of the separator.

Solution to Problem

The foregoing aspect of the present disclosure may be achieved by adjusting a rotation speed of a feeder roll that is rotated by a separate drive unit. Furthermore, the foregoing aspect of the present disclosure may be achieved by a moving speed and a moving trajectory of a guide roller. In addition, the foregoing aspect of the present disclosure may be achieved by adjusting a rotation speed of a feeder roll according to a moving speed and/or a moving position (trajectory) of a guide roller.

The foregoing aspect of the present disclosure is achieved through the following detailed description.

A cell stack manufacturing device for secondary batteries in the present disclosure may include a separator supply unit, a tension adjustment unit, and a stack stacking unit. The separator supply unit may supply a separator. The tension adjustment unit may adjust a tension of the separator moved from the separator supply unit. The stack stacking unit may be disposed below the tension adjustment unit. Furthermore, the tension adjustment unit may be provided with a feeder roll that is rotated by a feeder roll drive unit to adjust the tension of the separator. The feeder roll drive unit may rotate the feeder roll at a preset speed to adjust the tension of the separator.

Specifically, the separator supply unit may include a separator unwinder, a plurality of separator drive rollers, and a dancer unit. The separator unwinder may be wound with the separator. The plurality of separator drive rollers may guide the separator unwound from the separator unwinder to the tension adjustment unit. The dancer unit may be disposed between the separator unwinder and the tension adjustment unit.

Specifically, the dancer unit may include a plurality of dancer rollers, a first support member, and a second support member. The plurality of dancer rollers may be rotated by the movement of the separator. The first support member may support part of the plurality of dancer rolls. The second support member may support another part of the plurality of dancer rolls and may be disposed to be spaced apart from the first support member by a preset distance.

Specifically, the first support member may move or rotate around one side of the first support member as a central axis.

Specifically, the second support member may move or rotate around one side of the second support member as a central axis.

Specifically, the first support member and the second support member may be rotatable while moving.

Specifically, the tension adjustment unit may include a feeder roll, a feeder roll drive unit, and a guide roller. A pair of the feeder rolls may be provided. The roll drive unit may rotate the pair of feeder rolls. The guide roller may be disposed between the pair of feeder rolls and the stack stacking unit. The separator may pass through between the pair of feeder rolls and move to the guide roller.

Specifically, the pair of guide rollers may be provided to guide a separator that has passed through between the pair of feeder rolls so as to cover electrode plates sequentially stacked on the stack stacking unit.

Specifically, the pair of guide rollers may reciprocally move from a leftmost position to a rightmost position, and from the rightmost position to the leftmost position.

Specifically, the pair of guide rollers may reciprocally move a distance from the leftmost position to the rightmost position, which are divided into sections A, B, and C.

Specifically, the pair of guide rollers may move along an arc-shaped trajectory in an upward direction in the section A, move in a horizontal direction in the section B, and move along an arc-shaped trajectory in a downward direction in the section C while moving from the leftmost position to the rightmost position. At this time, the pair of guide rollers may perform a uniformly accelerated motion in the section A, a uniform velocity motion in the section B, and a uniformly decelerated motion in the section C.

Specifically, the pair of guide rollers may move along an arc-shaped trajectory in an upward direction in the section C, move in a horizontal direction in the section B, and move along an arc-shaped trajectory in a downward direction in the section A while moving from the rightmost position to the leftmost position. At this time, the pair of guide rollers may perform a uniformly accelerated motion in the section C, a uniform velocity motion in the section B, and a uniformly decelerated motion in the section A.

Specifically, the stack stacking unit may include a cell stack and a stack table. The cell stack may have a structure in which a plurality of electrode plates are respectively stacked with the separator interposed therebetween. The stack table may be disposed on the cell stack. Furthermore, the stack table may move in a downward direction when one electrode plate is covered with the separator.

According to an example of another embodiment of the present disclosure, the stack table may move in downward and upward directions while one electrode plate is covered with the separator.

A cell stack manufacturing device for secondary batteries according to another embodiment of the present disclosure may include a separator supply unit, a stack stacking unit, and a pair of guide rollers. The separator supply unit may supply a separator. The stack stacking unit may be formed such that the separator and an electrode plate are alternately stacked thereon. The pair of guide rollers may be disposed between the separator supply unit and the stack stacking unit to guide the separator to cover the electrode plate. Also, the pair of guide rollers may reciprocally move from a leftmost position to a rightmost position, and from the rightmost position to the leftmost position. The pair of guide rollers may move along an arc-shaped trajectory in an upward direction in a leftmost section while moving from the leftmost position to the rightmost position. The pair of guide rollers may move along an arc-shaped trajectory in an upward direction in a rightmost section while moving from the rightmost position to the leftmost position.

The cell stack manufacturing device for secondary batteries according to another embodiment of the present disclosure may further include a tension adjustment unit. The tension adjustment unit may adjust a tension of the separator moved from the separator supply unit. The tension adjustment unit may include a pair of feeder rolls, a feeder roll drive unit, and the guide roller. The feeder roll drive unit may rotate the pair of feeder rolls. The guide roller may be disposed between the pair of feeder rolls and the stack stacking unit. The separator may pass through between the pair of feeder rolls and moves to the guide roller. The pair of guide rollers may guide a separator that has passed through between the pair of feeder rolls so as to cover electrode plates sequentially stacked on the stack stacking unit.

Advantageous Effects of Invention

A cell stack manufacturing device for secondary batteries according to the present disclosure has an effect capable of controlling a tension of a separator that moves from a separator unwinder through a tension adjustment unit.

Furthermore, a cell stack manufacturing device for secondary batteries in the present disclosure has an effect capable of controlling a tension of a separator that moves from a separator unwinder to a feeder roll by controlling a rotation speed of the feeder roll.

In addition, a cell stack manufacturing device for secondary batteries in the present disclosure has an effect capable of maintaining a tension of a separator by a moving speed and/or a moving trajectory of a guide roller subsequent to a tension cut.

Moreover, a cell stack manufacturing device for secondary batteries in the present disclosure has an effect capable of controlling a tension of a separator by controlling a rotation speed of a feeder roll according to a moving speed and/or a moving position (trajectory) of a guide roller subsequent to a tension cut.

In addition, a cell stack manufacturing device for secondary batteries according to examples of an embodiment of the present disclosure may improve the efficiency of cell stack production and reduce defects caused by wrinkles in a separator, thereby having an effect of improving product reliability.

MODE FOR THE INVENTION

Hereinafter, embodiments of the present disclosure will be described in more detail with reference to the accompanying drawings. Among elements of the present disclosure, detailed descriptions of those that can be clearly understood and easily reproduced by those skilled in the art according to the prior art will be omitted so as not to obscure the subject matter of the present disclosure.

A cell stack manufacturing device for secondary batteries described herein is a device of manufacturing a cell stack for secondary batteries using a Z-stacking method. The Z-stacking method is a method of manufacturing a cell stack in which a long sheet-shaped separator is folded in a zigzag manner and one positive electrode plate and one negative electrode plate are alternately stacked between the folded separator.

Hereinafter, a cell stack manufacturing device of a secondary cell according to an example of an embodiment of the present disclosure will be described.

Figure 1:
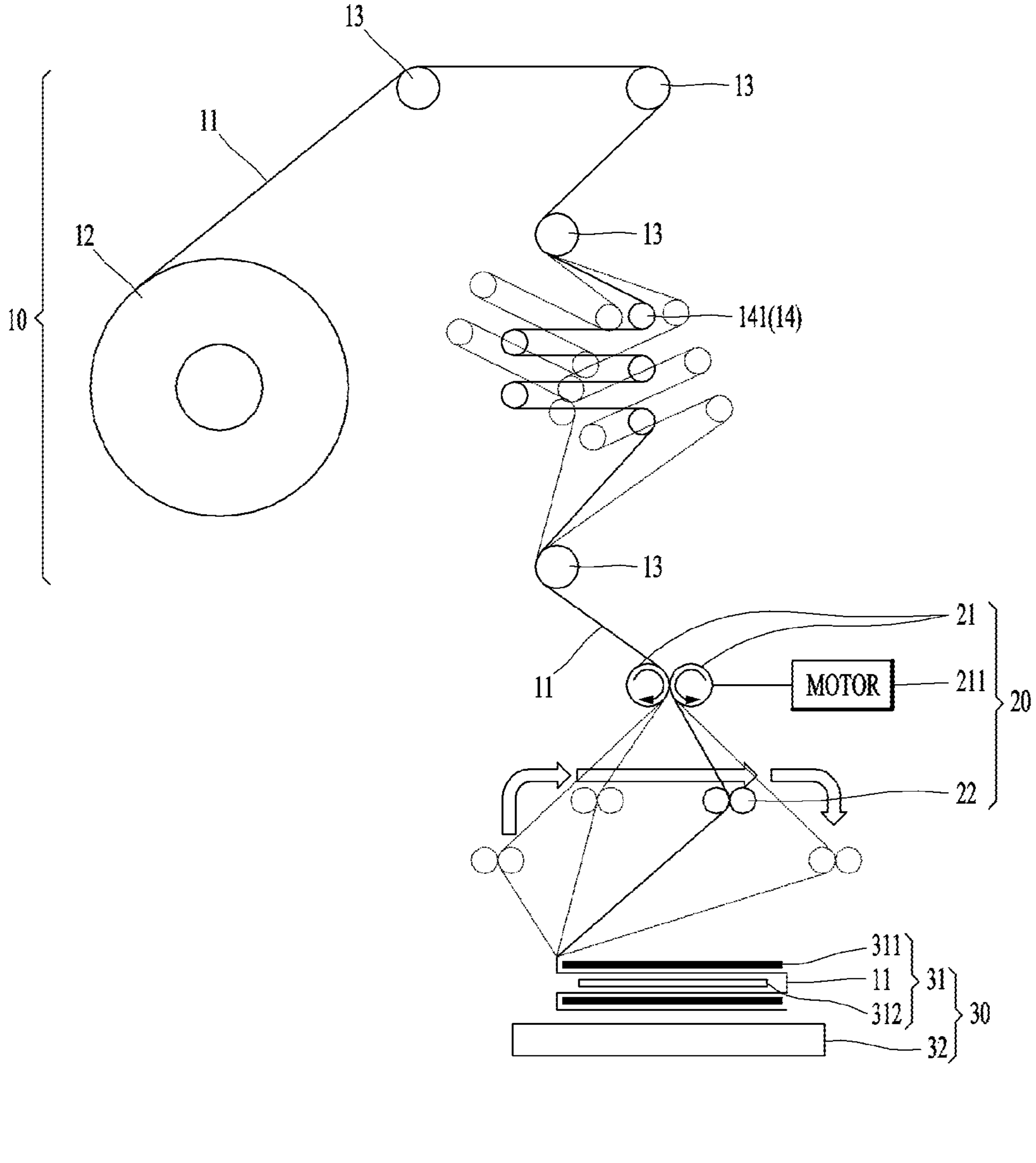
FIG. 1 shows a cell stack manufacturing device for secondary batteries according to an example of an embodiment of the present disclosure.

FIG. 1 shows a cell stack manufacturing device for secondary batteries according to an example of an embodiment of the present disclosure.

Referring to FIG. 1, a cell stack manufacturing device for secondary batteries according to an example of an embodiment of the present disclosure includes a separator supply unit 10, a tension adjustment unit 20, and a stack stacking unit.

The separator supply unit 10 supplies a separator 11 to the stack stacking unit 30.

The separator supply unit 10 includes a separator unwinder 12, a separator drive roller 13, and a dancer unit 14.

The separator unwinder 12 is wound with a long length of the separator 11.

The separator unwinder 12 may be positioned above, on the left or right side of the tension adjustment unit 20 and/or the stack stacking unit 30 depending on a number of separator drive rollers 13.

The separator unwinder 12 is rotated by a publicly known drive device. The drive device may include, for example, a drive motor, a decelerator, a pulley, a belt, and the like, and may include various connection members for connecting to the drive device.

A moving speed of the separator unwound from the separator unwinder 12 is the same up to a feeder roll 21, which will be described later. Therefore, the separator 11 from the separator unwinder 12 to the feeder roll 21 receives the same tension. In other words, the tension of the separator 11 from the separator unwinder 12 to the feeder roll 21 is maintained at a constant level.

In order to maintain the moving speed of the separator 11 moving from the separator unwinder 12 to the feeder roll 21 to be the same, a drive device that rotates the separator unwinder 12 rotates the separator unwinder 12 at a preset speed, and also, a feeder roll drive unit that rotates the feeder roll 21 rotates the feeder roll 21 at a preset speed.

Meanwhile, a cell stack manufacturing device for secondary batteries according to an example of an embodiment of the present disclosure is provided with a control unit (not shown).

The control unit controls the drive device of the separator unwinder 12 and the feeder roll drive unit. By a control signal from the control unit, the drive device of the separator unwinder 12 rotates the separator unwinder 12 at a preset speed. In addition, by the control signal from the control unit, the feeder roll drive unit rotates the feeder roll 21 at a preset speed.

The separator drive roller 13 guides the separator 11 unwound from the separator unwinder 12 to the tension adjustment unit 20. In addition, the separator drive roller 13 may prevent the separator 11 from sagging.

The separator drive roller 13 is configured in a rod shape having a circular cross section and a preset length in one direction. Here, the preset length is disposed to be larger than a width of the separator 11.

A plurality of separator drive rollers 13 may be disposed from the separator unwinder 12 to the tension adjustment unit 20.

As shown in FIG. 1, one or more separator drive rollers 13 may be disposed between the separator unwinder 12 and the dancer unit 14, and one or more thereof may be disposed between the dancer unit 14 and the tension adjustment unit 20.

A preset number of the separator drive rollers 13 may be disposed on a movement path of the separator 11 to guide the separator 11 from the separator unwinder 12 to the tension adjustment unit 20.

The separator drive roller 13 is provided (disposed) so as to be rotatable.

Specifically, the separator drive roller 13 is in a state of being rotatable (idle state), and is in a state of not being directly or indirectly connected to a specific drive unit (e.g., a motor, etc.). When the separator 11 unwound from the separator unwinder 12 moves in contact with the separator drive roller 13 by the rotation of the separator unwinder 12 and/or the feeder roll 21, which will be described later, the separator drive roller 13 is rotated by a frictional force with respect to the separator 11.

The dancer unit 14 is disposed between the separator unwinder 12 and the tension adjustment unit 20.

The dancer unit 14 may adjust a tension of the separator 11 and adjust an unwinding speed of the separator unwinder 12.

In order for the dancer unit 14 to adjust the tension of the separator 11 and adjust the unwinding speed of the separator unwinder 12, the dancer unit 14 may move or rotate in a left or right direction.

Figure 2:
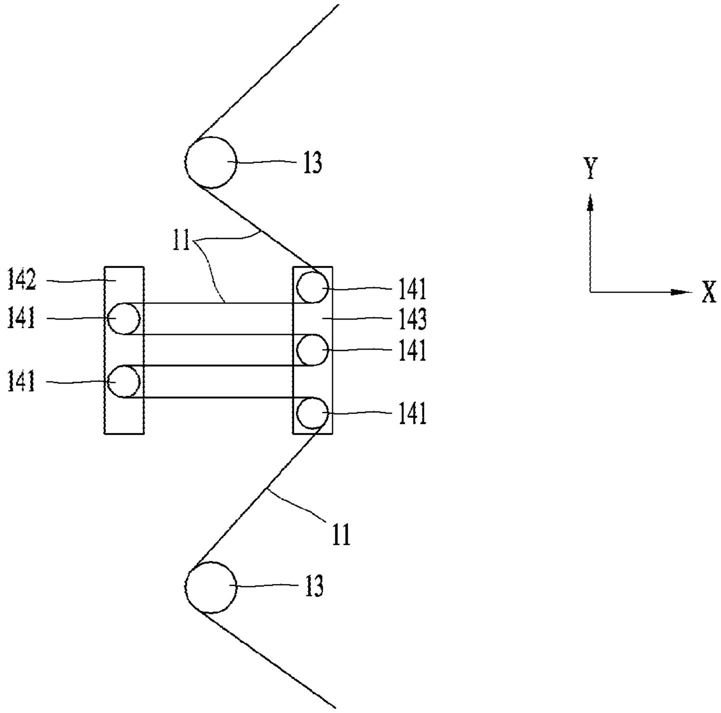
FIG. 2 shows a dancer unit in FIG. 1.
Figure 3A:
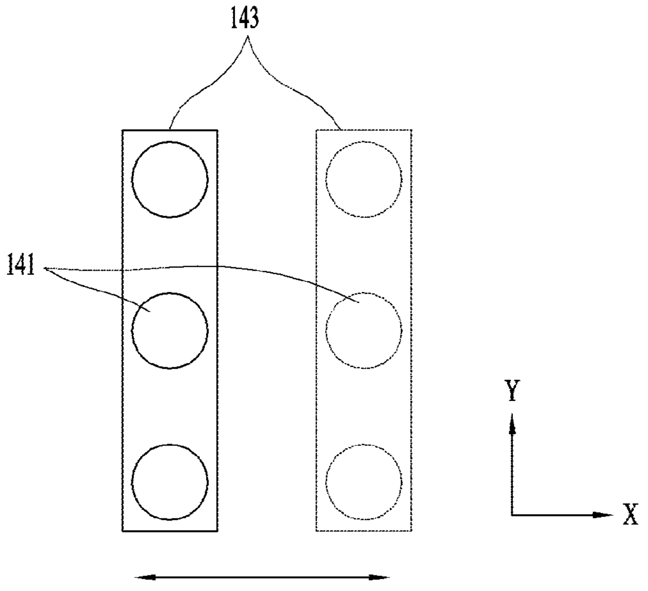
FIG. 3A shows a view in which a support member in FIG. 2 moves.
Figure 3B:
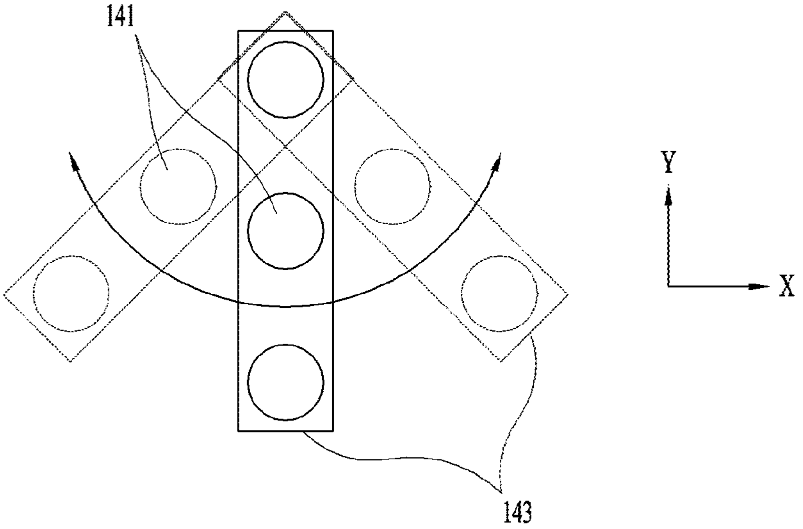
FIG. 3B shows a view in which the support member of FIG. 2 rotates.

FIG. 2 shows the dancer unit 14 in FIG. 1, FIG. 3A shows a view in which the support member 142, 143 in FIG. 2 moves, and FIG. 3B shows a view in which the support member 142, 143 in FIG. 2 rotates.

Referring to FIGS. 1 to 3A and 3B, the dancer unit 14 includes a dancer roll 141 that is rotated by a movement of the separator 11 and a support member 142, 143 that supports the dancer roll 141.

The dancer roll 141 is configured in a rod shape having a circular cross section and a preset length in one direction. Here, the preset length is disposed to be larger than a width of the separator 11.

The dancer roll 141 is supported by the support member 142, 143.

The dancer roll 141 is mounted so as to be rotatable.

Specifically, the dancer roll 141 is in a state of being rotatable (idle state), and is in a state of not being directly or indirectly connected to a drive unit such as a motor. When the separator 11 moves in contact with the dancer roller 141, the dancer roller 141 may be rotated by a frictional force with respect to the separator 11.

The support member 142, 143 includes a first support member 142 and a second support member 143 disposed on one side and the other side thereof, respectively.

The first support member 142 and the second support member 143 are disposed to be spaced apart from each other by a preset distance.

The first support member 142 supports part of a plurality of dancer rolls 141. That is, the plurality of dancer rollers 141 are rotatably disposed on the first support member 142.

A pair of the first support members 142 may be provided to allow the plurality of dancer rollers 141 to be rotatably mounted thereon. In other words, the dancer roll 141 is configured in a rod shape (having a circular cross section) having a preset length in one direction, and both end portions of the dancer roll 141 are rotatably supported by the pair of first support members 142. Here, the both end portions of the dancer roll 141 represent one end portion and the other end portion of the dancer roll 141.

Specifically, one of the pair of first support members 142 supports one end portion of the dancer roll 141, and the other one of the pair of first support members 142 supports the other end portion of the dancer roll 141.

In addition, the second support member 143 supports another part of the plurality of dancer rolls 141. That is, the plurality of dancer rollers 141 are rotatably disposed on the second support member 143.

A pair of the second support members 143 may be provided to allow the plurality of dancer rollers 141 to be rotatably mounted thereon. In other words, the dancer roll 141 is configured in a rod shape (having a circular cross section) having a preset length in one direction, and both end portions of the dancer roll 141 are rotatably supported by the pair of second support members 143. Here, the both end portions of the dancer roll 141 represent one end portion and the other end portion of the dancer roll 141.

Specifically, one of the pair of second support members 143 supports one end portion of the dancer roll 141, and the other one of the pair of second support members 143 supports the other end portion of the dancer roll 141.

The support member 142, 143 may move or rotate. In FIGS. 3A and 3B, the second support member 143 is shown, and the first support member 142 may also move or rotate.

Specifically, the first support member 142 and/or the second support member 143 may move in an x-axis direction or in a direction opposite to the x-axis direction (see FIG. 3A), or in a y-axis direction or in a direction opposite to the y-axis direction. Here, an x-axis and a y-axis represent axes that are orthogonal to each other.

Alternatively, the first support member 142 and/or the second support member 143 may rotate in the x-axis direction or in the direction opposite to the x-axis direction with respect to the y-axis direction (see FIG. 3B). When the support member 142, 143 rotates, one end portion of the support member 142, 143 may become a center axis of rotation.

In addition, the first support member 142 and/or the second support member 143 may rotate while moving. Specifically, the first support member 142 and/or the second support member 143 may move in the x-axis direction or the y-axis direction and rotate with respect to the y-axis direction.

The first support member 142 and the second support member 143 may move together. Alternatively, the first support member 142 may move, but the second support member 143 may not move. Alternatively, the first support member 142 may not move, but the second support member 143 may move. Here, moving denotes moving and/or rotating.

The support member 142, 143 may be provided with a publicly known movement drive device and a publicly known rotation drive device for the aforementioned movement and rotation. Here, the publicly known movement drive device and rotation drive device may include, for example, a drive motor, a decelerator, a pulley, a belt, and the like, and may include various connection members for connecting to the drive device.

The separator 11 is alternately wound around a plurality of dancer rollers 141 respectively disposed on the first support member 142 and the second support member 143. Specifically, the separator 11 is wound around the first dancer roll 141 mounted on the first support member 142 (or the second support member 143) and then wound around the first dancer roll 141 mounted on the second support member 143 (or the first support member 142). Then, the separator 11 is wound around the second dancer roll 141 mounted on the first support member 142 (or the second support member 143) and then wound around the second dancer roll 141 mounted on the second support member 143 (or the first support member 142). That is, the separator 11 passes through a plurality of dancer rollers 141 disposed on the first support member 142 and the second support member 143 in a sequential manner and moves to the tension adjustment unit 20.

The tension of the separator 11 may be adjusted by moving and/or rotating the aforementioned support member 142, 143, and the unwinding speed of the separator 11 may be adjusted in the separator unwinder 12.

The separator 11 supplied (moved) from the separator supply unit 10 moves to the tension adjustment unit 20. According to an example of an embodiment of the present disclosure, the separator 11 passes through the separator drive roller 13 disposed (mounted) between the dancer unit 14 and the tension adjustment unit 20 and then moves to the tension adjustment unit 20.

Figure 4:
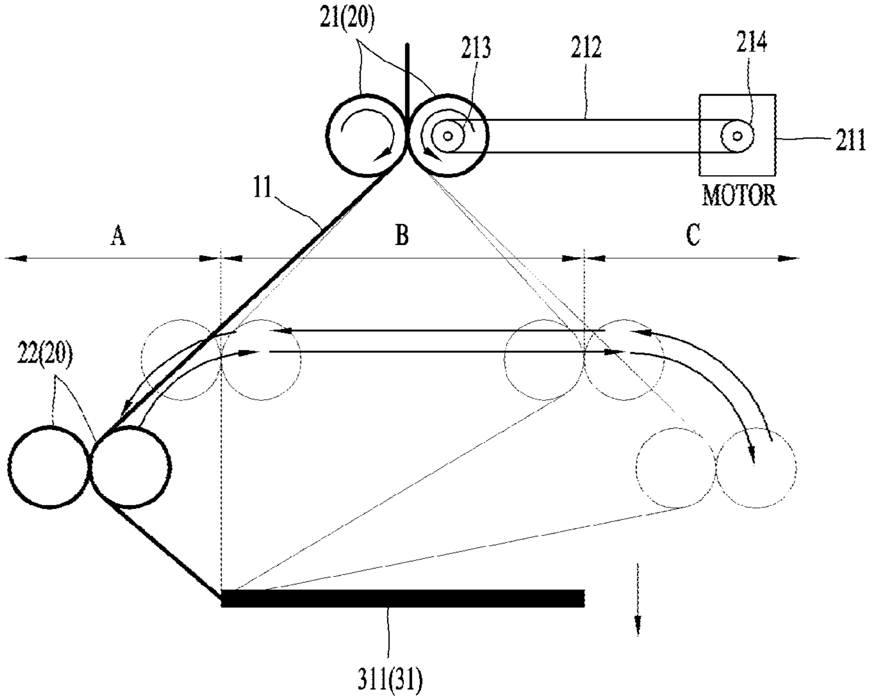
FIG. 4 shows a tension adjustment unit and a stack stacking unit in FIG. 1.

FIG. 4 shows the tension adjustment unit 20 and stack stacking unit 30 in FIG. 1.

Referring to FIG. 4, the tension adjustment unit 20 includes a feeder roll 21, a feeder roll drive unit, and a guide roller 22.

The tension adjustment unit 20 adjusts the tension of the separator 11.

The tension adjustment unit 20 is disposed on one side of the separator supply unit 10 and above the stack stacking unit 30, which will be described later. Here, one side of the separator supply unit 10 represents below or next to the separator supply unit 10.

The feeder roll 21 maintains the tension of the separator 11 supplied (moved) from the separator supply unit 10 at a constant level.

A pair of the feeder rolls 21 are provided. The separator 11 passes through between the pair of feeder rolls 21 and moves to the guide roller 22.

Either one of the pair of feeder rolls 21 allows the separator 11 to be in close contact with the other feeder roll 21. Therefore, the separator 11 is in close contact with the pair of feeder rolls 21, respectively. This means that the pair of feeder rolls 21 are in close contact with each other with the separator 11 interposed therebetween.

The pair of feeder rolls 21 are rotated by the feeder roll drive unit.

Specifically, either one of the pair of feeder rolls 21 is rotated by the feeder roll drive unit. The separator 11 is located between the pair of feeder rolls 21, wherein either one of the pair of feeder rolls 21 is rotated by the feeder roll drive unit, while the other feeder roll 21 is rotated by a frictional force with respect to the separator 11 that is being moved. Therefore, when either one of the pair of feeder rolls 21 rotates clockwise (or counterclockwise), the other one of the pair of feeder rolls 21 rotates counterclockwise (or clockwise).

A moving speed of the separator 11 moving between the pair of feeder rolls 21 is the same as that of the separator 11 moving between the separator unwinder 12 and the feeder rolls 21. Accordingly, the separator 11 passing through between the pair of feeder rolls 21 from the separator unwinder 12 receives the same tension. In other words, the tension of the separator 11 from the separator unwinder 12 to the feeder rolls 21 is maintained at a constant level.

As described above, in order to maintain the moving speed of the separator 11 that moves from the separator unwinder 12 to the feeder rolls 21 at the same level (i.e., in order to maintain the tension of the separator 11 from the separator unwinder 12 to the feeder rolls 21 at a constant level), the feeder roll drive unit that rotates the feeder rolls 21 rotates the feeder rolls 21 at a preset speed. In addition, a drive device that rotates the separator unwinder 12 rotates the separator unwinder 12 at a preset speed.

Meanwhile, the tension of the separator 11 that has passed through between the pair of feeder rolls 21 becomes lower than that of the separator 11 passing through between the pair of feeder rolls 21. Therefore, the pair of rotating feeder rolls 21 perform a tension cut function while maintaining the tension of the separator 11 at a constant level. Here, tension cut refers to a tension of the separator 11 being maintained differently before and after passing through the feeder rolls 21.

The feeder roll drive unit drives (rotates) the feeder rolls 21. Specifically, the feeder roll drive unit rotates a pair of the feeder rolls 21.

As shown in FIG. 4, the feeder roll drive unit includes a drive motor 211, a pulley 214 (referred to as a 'motor pulley') connected to a rotation shaft of the drive motor 211, a pulley 213 (referred to as a 'feeder roll pulley') connected to either one of a pair of feeder rolls 21, and a power transmission member 212 (e.g., a belt or chain) connecting the motor pulley 214 and the feeder roll pulley 213.

When electricity is supplied to electric wiring connected to the drive motor 211, the drive motor 211 is driven. The driving power (rotational power) of the drive motor 211 is transmitted to the feeder pulley 213 by the motor pulley 214 and the power transmission member 212. Therefore, either one of the pair of feeder rolls 21 disposed with the feeder roll pulley 213 rotates. The separator 11 disposed between the pair of feeder rolls 21 moves as the feeder rolls 21 rotate. Due to this, the separator 11 unwound from the separator unwinder 12 moves at a preset speed to the feeder rolls 21 (specifically, until passing through between the pair of feeder rolls 21), and the tension of the moving separator 11 is maintained at a constant level.

Although not shown, according to another embodiment of the present disclosure, the drive motor of the feeder roll drive unit may be directly connected to either one of the pair of feeder rolls 21. Specifically, the rotation shaft of the drive motor may be directly connected to a center portion of either one of the pair of feeder rolls 21. For example, a screw thread (male screw) may be disposed on the rotation shaft of the drive motor, and the rotation shaft may be fastened to a screw groove disposed in a center portion of the feeder roller 21 (a screw thread (female screw) is disposed on an inner surface of the screw groove) so as to allow the drive motor to be directly connected to either one of the pair of feeder rolls 21. In an example of this embodiment, the drive motor rotates the feeder rolls 21 without the aforementioned pulley and power transmission member.

The feeder drive unit (specifically, the drive motor) is controlled by a control unit (not shown). The control unit may adjust (control) a rotation speed of the drive motor 211 constituting the feeder roll drive unit. The feeder roll drive unit (specifically, the drive motor) rotates the feeder rolls 21 at a preset speed by a control signal from the control unit.

The guide roller 22 guides the separator 11 that has passed through the feeder rolls 21 to cover electrode plates that are sequentially stacked on the stack stacking unit 30. The electrode plates represent a positive electrode plate 311 and a negative electrode plate 312.

The guide roller 22 is disposed between the feeder rolls 21 and the stack stacking unit 30. Specifically, the guide roller 22 is disposed to be spaced by a preset distance in a downward direction from the feeder rolls 21 disposed in an upward direction. Furthermore, the guide roller 22 is disposed to be spaced by a preset distance in an upward direction from the stack stacking unit 30 disposed in a downward direction.

The guide roller 22 is provided (or disposed) so as to be rotatable.

Specifically, the guide roller 22 is in a state of being rotatable (idle state), and is in a state of not being directly or indirectly connected to a drive unit such as a motor. When the separator 11 that has passing through the feeder rolls 21 is guided by the guide roller 22, the guide roller 22 is rotated by a frictional force with respect to the separator 11.

A pair of the guide rollers 22 are provided.

The pair of guide rollers 22 cover the electrode plates stacked on the stack stacking unit 30 while guiding the separator 11. That is, the separator 11 passes through between the pair of guide rollers 22 and then is guided by the pair of guide rollers 22 and covered on the electrode plates.

The pair of guide rollers 22 move to fold the separator 11 in a zigzag manner. Specifically, the pair of guide rollers 22 may move along an elliptically-shaped trajectory. Here, the elliptically-shaped trajectory represents the shape of a movement path of the guide rollers 22.

Referring to FIG. 4, the pair of guide rollers 22 reciprocally move from a leftmost position to a rightmost position and from the rightmost position to the leftmost position along an elliptically-shaped trajectory.

The pair of guide rollers 22 reciprocally move from the leftmost position to the rightmost position, which are divided into sections A, B, and C. Specifically, the pair of guide rollers 22 move sequentially through the section A, the section B, and the section C, and then move sequentially through the section C, the section B, and the section A. The pair of guide rollers repeat the reciprocating movement.

The leftmost position represents a position spaced apart by a preset distance from a left end portion of a battery plate placed on the stack stacking unit 30 to the left along a horizontal direction. In FIG. 4, the section A represents a distance section from a left end portion of the battery plate to a leftmost position along a horizontal direction. That is, a distance in the section A represents a distance from a left end portion of the battery plate to the leftmost position to the left along a horizontal direction. The distance in the section A may vary depending on a length of the separator 11 covering the battery plate disposed in a horizontal direction.

The rightmost position represents a position spaced apart by a preset distance from a right end portion of the battery plate placed on the stack stacking unit 30 to the right along a horizontal direction. In FIG. 4, the section C represents a distance section from a right end portion of the battery plate to the rightmost position to the right along a horizontal direction. That is, a distance in the section C represents a distance from a right end portion of the battery plate to the rightmost position to the right along a horizontal direction. The distance in the section C may vary depending on a length of the separator 11 covering the battery plate disposed in a horizontal direction.

Meanwhile, the section B in FIG. 4 is connected to the section A and the section C, and represents a distance section between the section A and the section C. That is, one end portion of the section B is connected to the section A, and the other end portion of the section B is connected to the section C. A distance in the section B represents a distance between the section A and the section C along a horizontal direction. This is equal to a horizontal length of the battery plate disposed in a horizontal direction. Therefore, the distance in the section B may vary depending on a horizontal length of the battery plate disposed in a horizontal direction.

The pair of guide rollers 22 reciprocally move along an elliptically-shaped trajectory to fold the separator 11 in a zigzag manner.

Specifically, the pair of guide rollers 22 move along an arc-shaped trajectory in an upward direction in the section A, move in a horizontal direction in the section B, and move along an arc-shaped trajectory in a downward direction in the section C while moving from the leftmost position to the rightmost position. At this time, the pair of guide rollers 22 perform a uniformly accelerated motion in the section A, a uniform velocity motion in the section B, and a uniformly decelerated motion in the section C.

Furthermore, the pair of guide rollers 22 move along an arc-shaped trajectory in an upward direction in the section C, move in a horizontal direction in the section B, and move along an arc-shaped trajectory in a downward direction in the section A while moving from the rightmost position to the leftmost position. At this time, the pair of guide rollers 22 perform a uniformly accelerated motion in the section C, a uniform velocity motion in the section B, and a uniformly decelerated motion in the section A.

As the section A and the section C perform uniformly accelerated and uniformly decelerated motions, a production speed of a cell stack 31, which will be described later, may increase so as to obtain an effect of improving production efficiency.

The section B is a section where the separator 11 covers the battery plate, and as the pair of guide rollers 22 perform a uniform velocity motion in a horizontal direction in the section B, the separator 11 may cover the battery plate flatly without wrinkles under a constant tension (a tension having a low numerical value).

The pair of guide rollers 22 move from the leftmost position to the rightmost position along an elliptically-shaped trajectory. At this time, the separator 11 guided by the pair of guide rollers 22 covers the battery plate (e.g., the positive electrode plate 311) transferred to the stack table 32. Subsequently, the pair of guide rollers 22 move from the rightmost position to the leftmost position along an elliptically-shaped trajectory. At this time, the separator 11 guided by the pair of guide rollers 22 covers the battery plate (e.g., the negative electrode plate 312) transferred to the stack table 32.

As the pair of guide rollers 22 repeat a reciprocating movement as described above, the positive electrode plate 311 and the negative electrode plate 312 are stacked with the separator 11 interposed therebetween. As the positive electrode plate 311 and the negative electrode plate 312 are stacked with the separator 11 interposed therebetween, a cell stack 31, which will be described later, is formed.

After the separator 11 passes through the feeder rolls 21, a tension of the separator 11 becomes lower than that of the separator 11 before the separator 11 passes through the feeder rolls 21. Therefore, the separator 11 that has passed through the feeder rolls 21 is in a state where the tension is reduced (a state where the separator 11 is unwound from the feeder rolls 21). In this state, when the separator 11 is unwound by a preset length or while being unwound, the guide rollers 22 move from the leftmost position to the rightmost position along an elliptically-shaped trajectory, and the separator 11 is guided by the guide rollers 22 to cover the positive electrode plate 311 (or negative electrode plate 312) that is transferred to the stack table 32. Subsequently, when the separator 11 is unwound again by a preset length or while being released, the guide rollers 22 move from the rightmost position to the leftmost position along an elliptically-shaped trajectory, and the separator 11 is guided by the guide rollers 22 to cover the negative electrode plate 312 (or positive electrode plate 311) that is transferred to the stack table 32. Here, the preset length of the separator 11 that has passed through the feeder rolls 21 (i.e., the separator 11 in a state of being unwound from the feeder rolls 21) may vary depending on a horizontal length of the battery plate disposed in a horizontal direction.

As the pair of guide rollers 22 move along the aforementioned elliptically-shaped trajectory, the separator 11 that has passed through the feeder rolls 21 (the separator 11 in a state of being unwound from the feeder rolls 21) covers the battery plate while maintaining a constant tension by the pair of guide rollers 22. Here, it may be seen that the constant tension has a low numerical value. Accordingly, the separator 11 is uniformly covered on the battery plate without wrinkles.

A cell stack manufacturing device for secondary batteries according to an example of an embodiment of the present disclosure includes a fixed member (not shown) that presses down (holds) the electrode plate from one outer surface of the electrode plate whenever the separator 11 covers the electrode plate in a zigzag manner.

The fixed member serves to fix the electrode plate so as not to move in a process of covering the electrode plate while the separator 11 is guided by the guide rollers 22, for example, by pressing down and fixing one side of the electrode plate on a side where the separator 11 is covered when covering the battery plate on which the separator 11 is stacked.

As the pair of guide rollers 22 move along an arc-shaped trajectory in an upward direction in the section A when the pair of guide rollers 22 move from the leftmost position to the rightmost position, and in the section C when moving from the rightmost position to the leftmost position, the pair of guide rollers 22 may avoid the fixed member. In addition, as the pair of guide rollers 22 lift the separator 11 in an upward direction and move it in a horizontal direction, the separator 11 in a state of being unwound from the feeder rolls 21 is spread flat without wrinkles.

The pair of guide rollers 22 may be provided with a publicly known movement drive device for the aforementioned reciprocating movement. Here, the publicly known movement drive device may include, for example, a drive motor, a decelerator, a pulley, a belt, and the like, and may include various connection members for connecting to the drive device.

The stack stacking unit 30 includes a cell stack 31 and a stack table 32.

The cell stacks 31 is stacked on the stack stacking unit 30.

The stack stacking unit 30 is disposed below the tension adjustment unit 20.

The cell stack 31 has a structure in which a plurality of electrode plates are respectively stacked with the separator 11 interposed therebetween. Here, the electrode plates represent a positive electrode plate 311 and a negative electrode plate 312.

Specifically, the cell stack 31 has a structure in which, for example, a positive electrode plate 311 is stacked, a separator 11 is covered over the positive electrode plate 311, a negative electrode plate 312 is stacked over the separator 11, and the separator 11 is covered over the negative electrode plate 312. That is, the cell stack 31 has a structure in which positive electrode plates 311 and negative electrode plates 312 are alternately stacked with a separator 11 interposed therebetween.

As described above, the cell stack 31 is formed by repeatedly guiding the separator 11 in a state of being unwound from the feeder rolls 21 onto the battery plate while the pair of guide rollers 22 repeat a reciprocating movement.

The cell stack 31 is manufactured on the stack table 32.

The stack table 32 may not move. In other words, while the cell stack 31 is manufactured by repeating a reciprocating movement by the pair of guide rollers 22, the stack table 32 may not move.

In addition, the stack table 32 may move in downward and upward directions.

The stack table 32 moves in a downward direction when one electrode plate is covered with the separator 11. Specifically, when one electrode plate transferred to the stack table 32 is covered with the separator 11, the stack table 32 moves in a downward direction by a preset length. Here, the preset length represents a combined length of a thickness of the separator 11 and a thickness of the electrode plate. Accordingly, a distance between the battery plates transferred from the feeder rolls 21 to the stack table 32 is maintained at a constant level.

The stack table 32 moves in an upward direction to receive electrode plates constituting another cell stack 31 when one cell stack 31 manufactured on the stack table 32 is removed (i.e., transferred to another location). Accordingly, a distance between the battery plates transferred from the feeder rolls 21 to the stack table 32 is maintained at a constant level.

Although not shown, a cell stack manufacturing device for secondary batteries according to an example of an embodiment of the present disclosure includes a positive electrode plate supply unit disposed on one side of a stack table 32 to transfer (move) a positive electrode plate 311 onto the stack table 32, and a negative electrode plate supply unit disposed on the other side of the stack table 32 to transfer (move) a negative electrode plate 312 onto the stack table 32.

The positive electrode plate supply unit and the negative electrode plate supply unit continuously supply the positive electrode plates 311 and the negative electrode plates 312 to the stack table 32.

The positive electrode plate supply unit and the negative electrode plate supply unit may be provided with a publicly known movement drive device and various connection members to move the positive electrode plate 311 and the negative electrode plate 312.

As described above, the stack table 32 may not move while the guide rollers 22 repeat a reciprocating movement, but according to an example of another embodiment of the present disclosure, the stack table 32 may move in a constant shape (trajectory).

Figure 5:
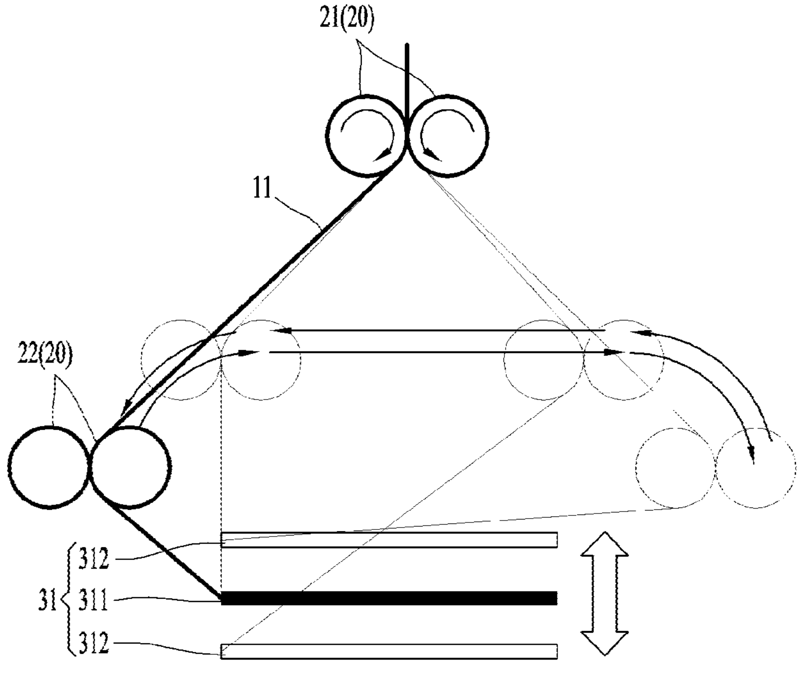
FIG. 5 shows an example of another embodiment of the stack stacking unit.

According to another embodiment of the present disclosure, the stack table 32 moves in downward and upward directions. Specifically, the stack table 32 moves in downward and upward directions while one electrode plate is covered with the separator 11. FIG. 5 shows an example of another embodiment of the stack stacking unit 30.

Referring to FIG. 5, when the pair of guide rollers 22 are moving between the leftmost position and the rightmost position, the stack table 32 moves in a downward direction from a first position by a preset distance to reach a second position, and then moves in an upward direction again by a preset distance, so as to maintain the tension of the separator 11 at a constant level. When the pair of guide rollers 22 are at (or arrive at) the leftmost position and the rightmost position, the stack table 32 is positioned at the first position.

The downward movement and the upward movement of the pair of guide rollers 22 are performed continuously each time the electrode plate is stacked.

The movement path of the pair of guide rollers 22 and the stack table 32 will be described as follows, for example.

The stack table 32 is positioned at the first position when the pair of guide rollers 22 are at the leftmost position, the stack table 32 starts moving to the second position when the pair of guide rollers 22 start from the leftmost position, the stack table 32 reaches the second position when the pair of guide rollers 22 arrive at a middle portion between the leftmost position and the rightmost position, and the stack table 32 starts moving to the first position again when the pair of guide rollers 22 pass the middle portion. Furthermore, when the pair of guide rollers 22 arrive at the rightmost position, the stack table 32 is positioned at the first position. Here, the second position represents a position spaced from the first position by a preset distance in a downward direction.

Furthermore, the stack table 32 starts moving to the second position when the pair of guide rollers 22 start from the rightmost position, the stack table 32 reaches the second position when the pair of guide rollers 22 arrive at a middle portion between the rightmost position and the leftmost position, and the stack table 32 starts moving to the first position again when the pair of guide rollers 22 pass the middle portion. Furthermore, when the pair of guide rollers 22 arrive at the leftmost position, the stack table 32 is positioned at the first position.

The downward movement and the upward movement of the foregoing pair of guide rollers 22 are performed continuously each time the electrode plate is stacked.

As described above, a cell stack manufacturing device for secondary batteries according to examples of an embodiment of the present disclosure may control a tension of the separator 11 moving from the separator unwinder 12 through the tension adjustment unit 20.

Specifically, a cell stack manufacturing device for secondary batteries in the present disclosure may adjust (control) a rotation speed of the feeder rolls 21 to adjust (control) a tension of the separator 11 moving from the separator unwinder 12 to the feeder rolls 21.

Specifically, a cell stack manufacturing device for secondary batteries in the present disclosure may maintain a tension of the separator by a moving speed and/or a moving trajectory of the guide rollers 22 subsequent to a tension cut.

Specifically, a cell stack manufacturing device for secondary batteries in the present disclosure may adjust (control) a rotation speed of the feeder rolls 21 according to a moving speed and/or a moving position (trajectory) of the guide rollers 22 subsequent to a tension cut, thereby adjusting (controlling) a tension of the separator 11.

A cell stack manufacturing device for secondary batteries according to examples of an embodiment of the present disclosure may adjust (control) a tension of the separator 11 so as to improve an efficiency in producing the cell stack 31, and reduce a defect caused by wrinkles in the separator so as to improve the reliability of the product.

Features, structures, effects, and the like described in the embodiments above are included in at least one embodiment, and are not necessarily limited to only one embodiment. Furthermore, the features, structures, effects, and the like illustrated in each embodiment may be combined or modified for other embodiments by those skilled in the art to which the embodiments pertain. Therefore, contents related to such combinations and modifications should be construed as being included in the scope of the present disclosure.

In addition, although the embodiments have been described above, these are only examples and are not intended to limit the present disclosure, and it will be apparent to those skilled in this art that various modifications and applications may be made thereto without departing from the subject matter of the present disclosure. That is, each element shown in detail in the embodiments may be implemented in various modifications. Furthermore, all differences associated with the modifications and applications should be construed to be included in the scope of the present disclosure as defined in the accompanying claims.

DESCRIPTION OF SYMBOLS

10: Separator supply unit
11: Separator
12: Separator unwinder
13: Separator drive roller
14: Dancer unit
141: Dancer roll
142: First support member
143: Second support member
20: Tension adjustment unit
21: Feeder roll
211: Motor
212: Power transmission member
213: Feeder roll pulley
214: Motor pulley
22: Guide roller
30: Stack stacking unit
31: Cell stack
311: Positive electrode plate
312: Negative electrode plate
32: Stack table

What is claimed is:

1. A cell stack manufacturing device for secondary batteries, the device comprising:

a separator supply unit that supplies a separator;

a tension adjustment unit that adjusts a tension of the separator moved from the separator supply unit; and a stack stacking unit disposed below the tension adjustment unit, wherein the tension adjustment unit comprises:

a feeder roll provided as a pair of feeder rolls;

a feeder roll drive unit that rotates the pair of feeder rolls; and a guide roller arranged between the pair of feeder rolls and the stack stacking unit, the feeder roll drive unit rotates the feeder roll at a preset speed to adjust the tension of the separator, the separator passes through between the pair of feeder rolls and moves to the guide roller, and the guide roller moves in a state of being arranged on the stack stacking unit to cover an electrode plate arranged on the stack stacking unit, wherein a pair of the guide rollers are provided to guide the separator that has passed through between the pair of feeder rolls so as to cover electrode plates sequentially stacked on the stack stacking unit, wherein the pair of guide rollers reciprocally move from a leftmost position to a rightmost position, and from the rightmost position to the leftmost position, wherein the pair of guide rollers reciprocally move a distance from the leftmost position to the rightmost position, which are divided into sections A, B, and C, and wherein the pair of guide rollers move along an arc-shaped trajectory in an upward direction in the section A, move in a horizontal direction in the section B, and move along an arc-shaped trajectory in a downward direction in the section C while moving from the leftmost position to the rightmost position.

2. The device of claim 1, wherein the separator supply unit comprises:

a separator unwinder around which the separator is wound;

a plurality of separator drive rollers that guide a separator unwound from the separator unwinder to the tension adjustment unit; and a dancer unit disposed between the separator unwinder and the tension adjustment unit.

3. The device of claim 2, wherein the dancer unit comprises:

a plurality of dancer rolls that are rotated by a movement of the separator;

a first support member that supports a first part of the plurality of dancer rolls; and a second support member that supports a second part of the plurality of dancer rolls and is spaced apart from the first support member by a preset distance.

4. The device of claim 3, wherein the first support member moves or rotates around one side of the first support member as a central axis.

5. The device of claim 3, wherein the second support member moves or rotates around one side of the second support member as a central axis.

6. The device of claim 3, wherein the first support member and the second support member are rotatable while moving.

7. The device of claim 1, wherein the pair of guide rollers perform a uniformly accelerated motion in the section A, a uniform velocity motion in the section B, and a uniformly decelerated motion in the section C.

8. The device of claim 1, wherein the stack stacking unit comprises:

a cell stack in which a plurality of electrode plates are respectively stacked with the separator interposed therebetween; and a stack table on which the cell stack is disposed, and wherein the stack table moves in a downward direction when one electrode plate is covered with the separator.

9. The device of claim 1, wherein the stack stacking unit comprises:

a cell stack in which a plurality of electrode plates are respectively stacked with the separator interposed therebetween; and a stack table on which the cell stack is disposed.

10. The device of claim 9, wherein the stack table moves in downward and upward directions while one electrode plate is covered with the separator.

11. A cell stack manufacturing device for secondary batteries, the device comprising:

a separator supply unit that supplies a separator;

a tension adjustment unit that adjusts a tension of the separator moved from the separator supply unit; and a stack stacking unit disposed below the tension adjustment unit, wherein the tension adjustment unit comprises:

a feeder roll provided as a pair of feeder rolls;

a feeder roll drive unit that rotates the pair of feeder rolls; and a guide roller arranged between the pair of feeder rolls and the stack stacking unit, the feeder roll drive unit rotates the feeder roll at a preset speed to adjust the tension of the separator, the separator passes through between the pair of feeder rolls and moves to the guide roller, and the guide roller moves in a state of being arranged on the stack stacking unit to cover an electrode plate arranged on the stack stacking unit, and wherein a pair of the guide rollers are provided to guide the separator that has passed through between the pair of feeder rolls so as to cover electrode plates sequentially stacked on the stack stacking unit, wherein the pair of guide rollers reciprocally move from a leftmost position to a rightmost position, and from the rightmost position to the leftmost position, wherein the pair of guide rollers reciprocally move a distance from the leftmost position to the rightmost position, which are divided into sections A, B, and C, and wherein the pair of guide rollers move along an arc-shaped trajectory in an upward direction in the section C, move in a horizontal direction in the section B, and move along an arc-shaped trajectory in a downward direction in the section A while moving from the rightmost position to the leftmost position.

12. The device of claim 11, wherein the pair of guide rollers perform a uniformly accelerated motion in the section C, a uniform velocity motion in the section B, and a uniformly decelerated motion in the section A.

13. A cell stack manufacturing device for secondary batteries, the device comprising:

a separator supply unit that supplies a separator;

a stack stacking unit on which the separator and an electrode plate are alternately stacked; and a pair of guide rollers disposed between the separator supply unit and the stack stacking unit to guide the separator to cover the electrode plate, wherein the pair of guide rollers reciprocally move from a leftmost position to a rightmost position, and from the rightmost position to the leftmost position, wherein the pair of guide rollers move along an arc-shaped trajectory in an upward direction in a leftmost section while moving from the leftmost position to the rightmost position, wherein the pair of guide rollers move along an arc-shaped trajectory in an upward direction in a rightmost section while moving from the rightmost position to the leftmost position, and wherein the pair of guide rollers move in a horizontal direction between the leftmost section and the rightmost section.

14. The device of claim 13, wherein the pair of guide rollers reciprocally move a distance from the leftmost position to the rightmost position, which are divided into sections A, B, and C.

15. The device of claim 14, wherein the pair of guide rollers move along an arc-shaped trajectory in an upward direction in the section A, move in a horizontal direction in the section B, and move along an arc-shaped trajectory in a downward direction in the section C while moving from the leftmost position to the rightmost position.

16. The device of claim 15, wherein the pair of guide rollers perform a uniformly accelerated motion in the section A, a uniform velocity motion in the section B, and a uniformly decelerated motion in the section C.

17. The device of claim 14, wherein the pair of guide rollers move along an arc-shaped trajectory in an upward direction in the section C, move in a horizontal direction in the section B, and move along an arc-shaped trajectory in a downward direction in the section A while moving from the rightmost position to the leftmost position.

18. The device of claim 17, wherein the pair of guide rollers perform a uniformly accelerated motion in the section C, a uniform velocity motion in the section B, and a uniformly decelerated motion in the section A.

19. The device of claim 13, further comprising:

a tension adjustment unit that adjusts a tension of the separator moved from the separator supply unit, wherein the tension adjustment unit comprises:

a pair of feeder rolls provided therein;

a feeder roll drive unit that rotates the pair of feeder rolls; and the guide roller disposed between the pair of feeder rolls and the stack stacking unit, wherein the separator passes through between the pair of feeder rolls and moves to the guide roller, and wherein the pair of guide rollers guide a separator that has passed through between the pair of feeder rolls so as to cover electrode plates sequentially stacked on the stack stacking unit.

* * * * *